March 23, 1926. 1,578,102
J. C. STOTZ
ROTARY HARROW
Filed March 21, 1925 3 Sheets-Sheet 1
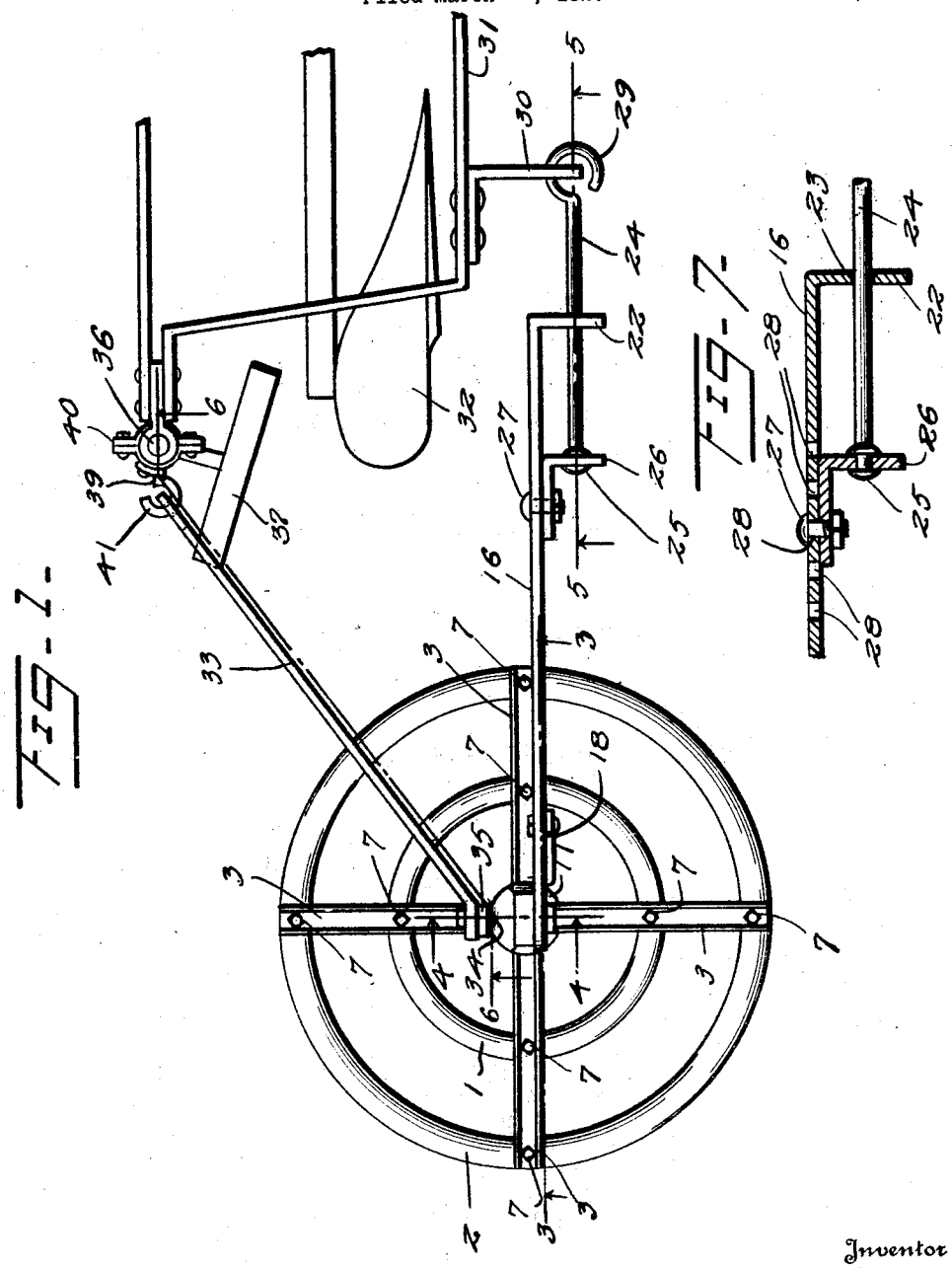
Inventor
J. C. Stotz
By
Attorney

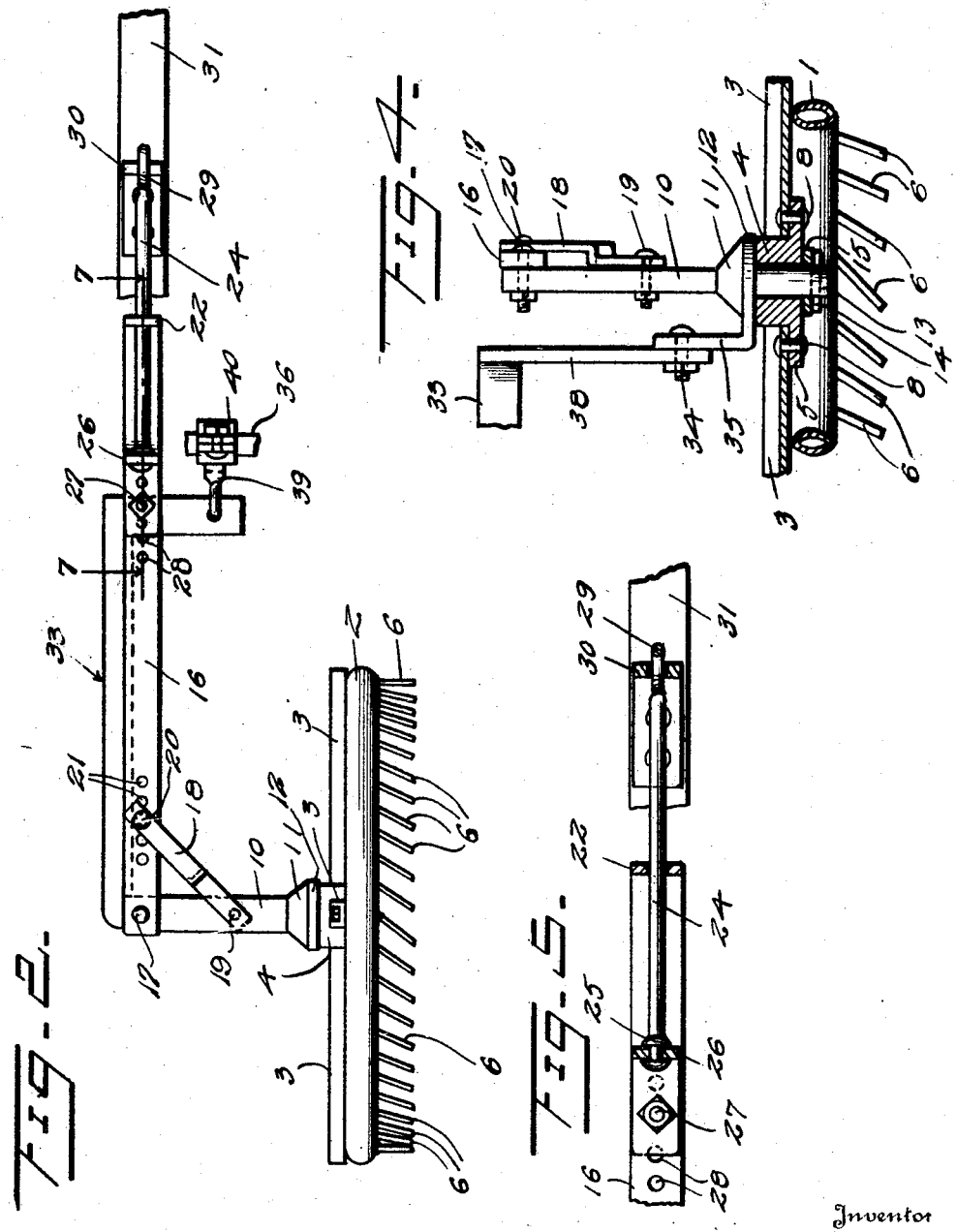

March 23, 1926. 1,578,102
J. C. STOTZ
ROTARY HARROW
Filed March 21, 1925 3 Sheets-Sheet 3
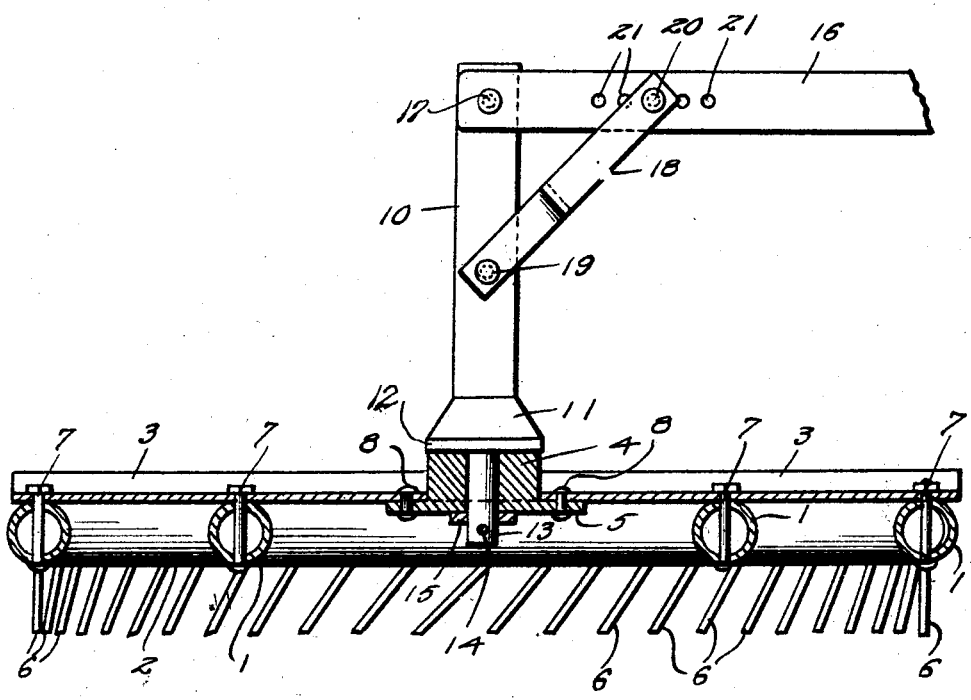
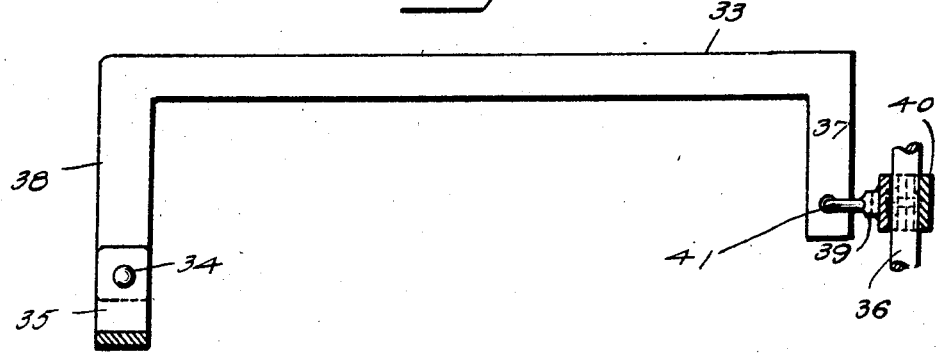
Inventor
J. C. Stotz Patented Mar. 23, 1926.

1,578,102

UNITED STATES PATENT OFFICE.

JOHN C. STOTZ, OF TOLSTOY, SOUTH DAKOTA.

ROTARY HARROW.

Application filed March 21, 1925. Serial No. 17,282.

*To all whom it may concern:*

Be it known that I, JOHN C. STOTZ, a citizen of the United States, residing at Tolstoy, in the county of Potter and State of South Dakota, have invented certain new and useful Improvements in Rotary Harrows; and I do hereby declare the following to be a full, clear, and exact description of the invention, such as will enable others skilled in the art to which it appertains to make and use the same.

This invention relates to rotary harrows and has for one of its objects to improve and simplify the general construction of devices of this character and to provide one wherein the teeth are so arranged as to constitute the means for imparting motion to the harrow as it advances along the ground.

A further object of the invention is the provision of novel and simple draft means by which the harrow may be readily attached to a sulky, gang, triple or tractor plow.

With the above and other objects in view, the invention consists of the construction, combination and arrangement of parts hereinafter fully described and claimed, and illustrated in the accompanying drawings, wherein:

Figure 1 is a top plan view of the harrow and draft means, a portion of a plow being shown to illustrate the manner in which the draft means are secured thereto, Figure 2 is a view in side elevation of the harrow and draft means, Figure 3 is a sectional view taken on the plane indicated by the line 3—3 of Figure 1, Figure 4 is a sectional view taken on the plane indicated by the line 4—4 of Figure 1, Figure 5 is a sectional view taken on the plane indicated by the line 5—5 of Figure 1, Figure 6 is a sectional view taken on the plane indicated by the line 6—6 of Figure 1, and Figure 7 is a sectional view on the line 7—7 of Figure 2.

Corresponding and like parts are referred to in the following description, and designated in the several views of the drawings, by similar reference characters.

The harrow comprises inner and outer tubular rings 1 and 2, respectively, spokes 3 of U-shape in cross section, a hub 4 provided at its lower end with an annular flange 5, and teeth 6 arranged at an angle of approximately 45° with respect to the horizontal. The spokes 3 are secured to the rings 1 and 2 by bolts 7 and to the flange 5 of the hub 4 by rivets 8. A vertical axle 10 is provided with a base 11 which rests upon a disk 12 positioned upon the upper end of the hub 4, and with a journal 13 which passes through the hub. The axle 10 is secured in place by a pin 14 carried by the journal 13 between which and the lower end of the hub 4 a washer 15 is positioned.

As the harrow advances along the ground, the teeth 6, due to their angular set, cause it to rotate about the axle 10. The axle 10 is held against rotation by the draft means by which the harrow is connected to a plow.

The draft means comprise a beam 16 which is pivotally connected at its rear end to the upper end of the axle 10 as at 17 and which is supported by a brace 18 pivoted at its lower end as at 19 to the axle 10 and connected at its upper end to the beam by a bolt 20. The beam 16 is provided with a longitudinally extending series of openings 21 through a selected one of which the bolt 20 passes, the openings permitting the brace 18 to support the beam in a horizontal or in a downwardly or upwardly inclined position. The front end of the beam is angularly offset to provide a guide 22 through the opening 23 of which a clevis rod 24 passes. The clevis rod 24 has a swivel connection 25 with a bracket 26 provided to the beam 16 by a bolt 27. The beam 16 is provided with a longitudinally arranged series of openings 28 through a selected one of which the bolt 27 passes, these openings permitting the bracket 26 to be adjusted toward and from the guide 22 whereby to increase or decrease the effective length of the beam. The front end of the clevis rod 24 is provided with a hook 29 adapted to engage a bracket 30 secured to one of the side bars 31 of the frame of the plow 32. A stay bar 33 which is pivotally connected as at 34 to an arm 35 extending upwardly from the disk 12 and which is pivotally connected to the axle 36 of the wheel 37 of the plow 32, is adapted to prevent the harrow from having any lateral movement with respect to the plow. The bar 33 is provided with arms 37 and 38, respectively, the arm 38 being secured to the arm 35 and the arm 37 to the axle 36. The connection between the bar 33 and the axle 36 is established by a rod 39 which is fixed to the axle by a clamp 40 and which is pivotally connected to the arm 37 by a hook 41.

As the clevis rod 24 is swivelly connected to the bracket 26, as the bracket is pivotally connected to the beam 16, and due to the pivotal connection of the bar 33 with the axle 10 and its loose connection with the axle 36, the harrow may rock to conform to the unevenness of the ground about axes extending longitudinally and transversely with respect to the plow 32. To attach the harrow to the plow, it is only necessary to secure the bracket 30 to the frame bar 31 and the clamp 40 to the axle 36.

From the foregoing description, taken in connection with the accompanying drawings, the advantages of the construction of the harrow and draft means should be readily apparent to those skilled in the art to which the invention appertains. While I have described the principle of operation of the invention, together with the structure which I now consider to be the best embodiment thereof, I desire to have it understood that the structure shown is merely illustrative, and that such changes may be made when desired as are within the scope of the invention as claimed.

What is claimed is:—

1. In combination, a harrow, a vertical axle upon which the harrow is rotatably mounted, a beam secured at one end to the axle and provided at its other end with a guide, a bracket pivotally connected to the beam, and a clevis rod passing through the guide and swivelled to the bracket.

2. In combination, a harrow, a vertical axle upon which the harrow is rotatably mounted, a beam pivoted at one end to the axle and provided at its other end with a guide, a bracket pivotally and adjustably mounted upon the beam, and a clevis passing through the guide and swivelly connected to the bracket.

3. In combination, a harrow, a vertical axle upon which the harrow is rotatably mounted, a beam pivotally connected at one end to the axle and provided at its other end with a guide, a brace pivoted to the axle and adjustably connected to the beam, a bracket pivotally and adjustably secured to the beam, and a clevis passing through the guide and swivelly connected to the bracket.

4. In combination, a harrow, a vertical axle upon which the harrow is rotatably mounted, a beam connected to the axle and provided with a clevis, a stay bar pivotally connected to the axle, and a clamp having a loose connection with the stay bar.

In testimony whereof I affix my signature.

JOHN C. STOTZ.